Figure 3:
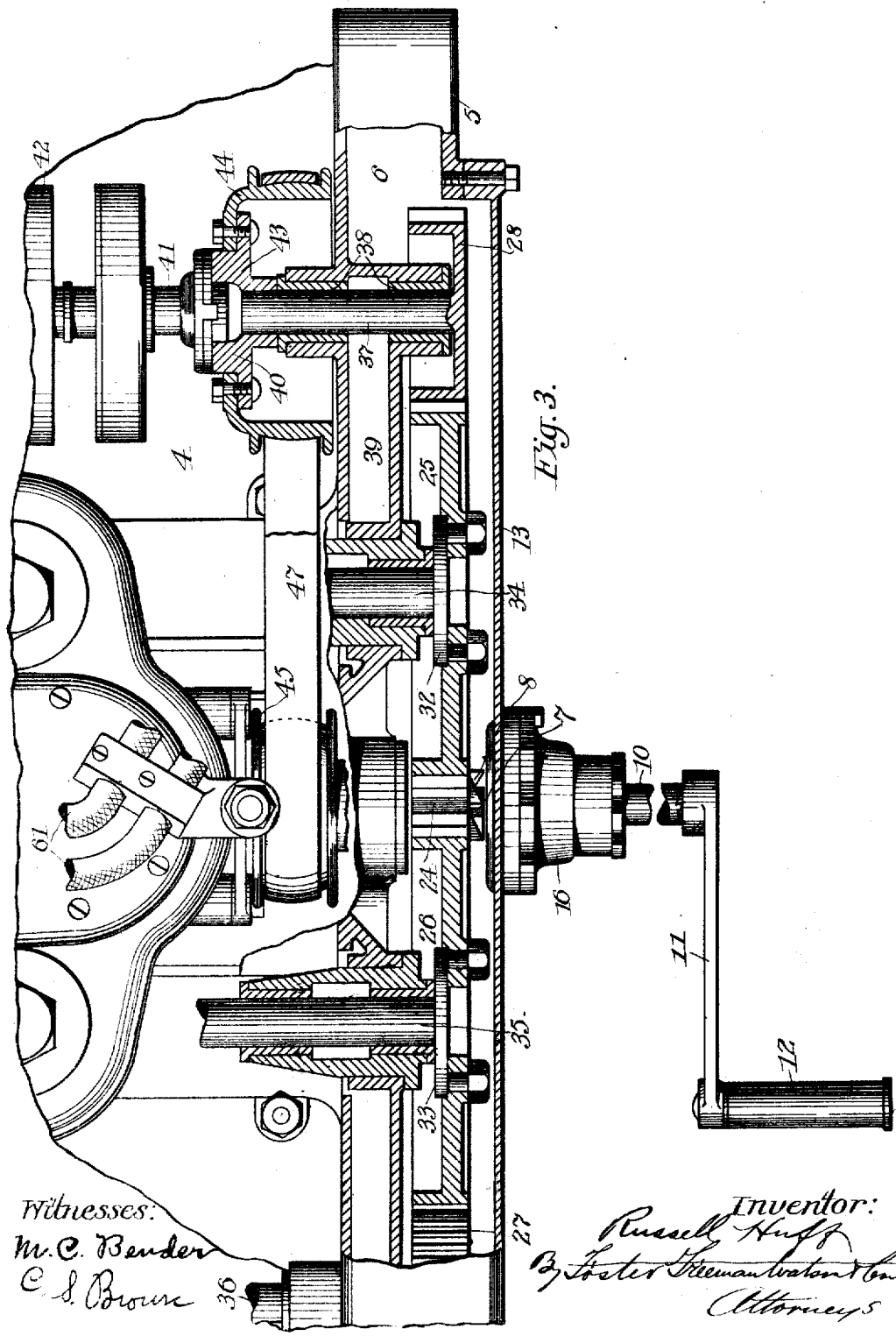

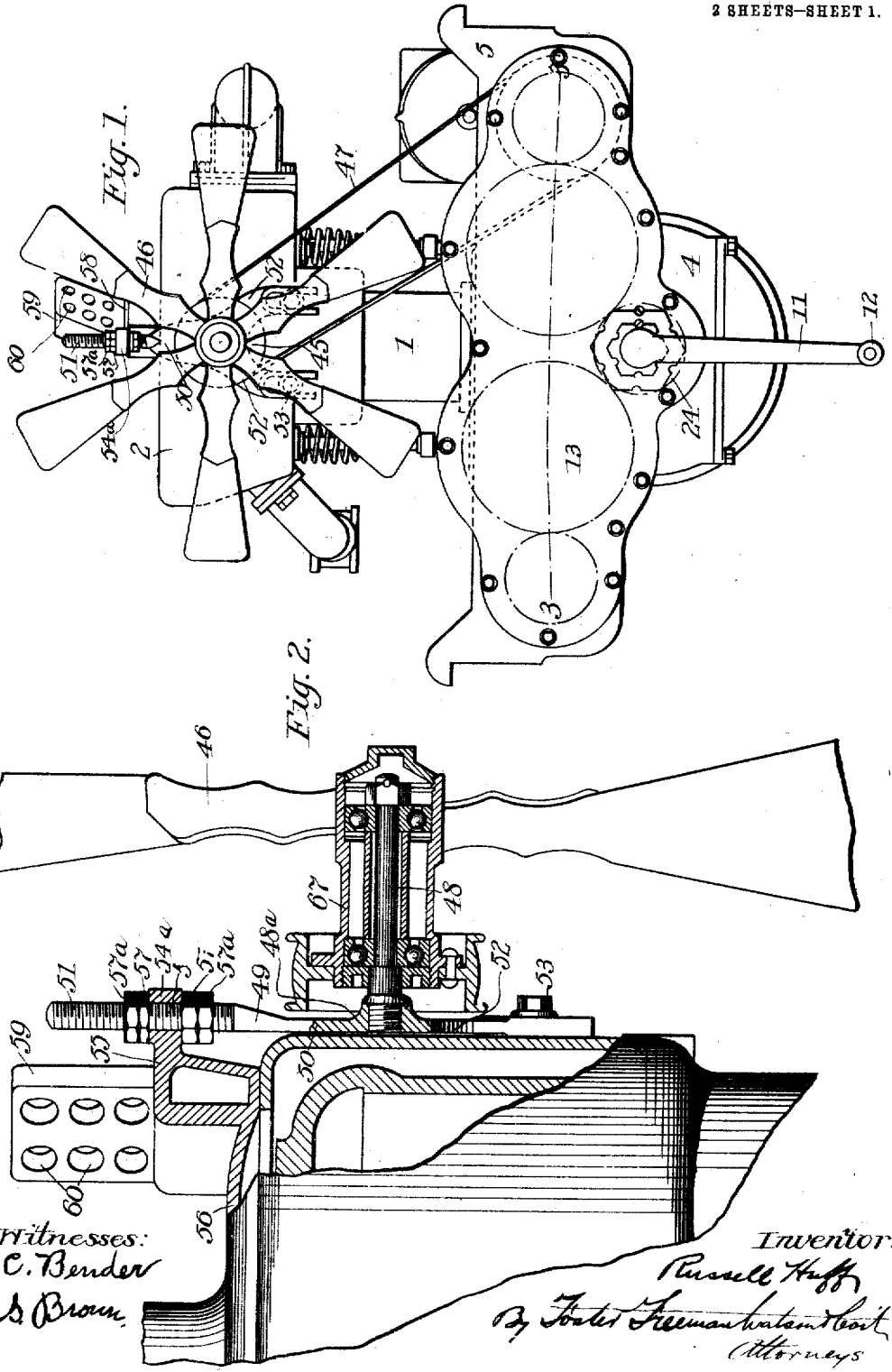

R. HUFF.
MOTOR VEHICLE.
APPLICATION FILED OCT. 12, 1910.

1,003,963.

Patented Sept. 19, 1911.
2 SHEETS—SHEET 2.

Witnesses:
M. C. Bender
C. S. Brown

Inventor:
Russell Huff
By Foster Freeman Watson & Coit
Attorneys

UNITED STATES PATENT OFFICE.

RUSSELL HUFF, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

MOTOR-VEHICLE.

1,003,963.  Specification of Letters Patent.  Patented Sept. 19, 1911.

Original application filed June 27, 1908, Serial No. 440,699. Divided and this application filed October 12, 1910. Serial No. 586,749.

*To all whom it may concern:*

Be it known that I, RUSSELL HUFF, a citizen of the United States, and resident of Detroit, Wayne county, State of Michigan, have invented certain new and useful Improvements in Motor-Vehicles, of which the following is a specification.

This application is a divison of my application, Serial No. 440,699, filed June 27, 1908.

This invention relates to motor vehicles and particularly to the fan driving mechanism of a hydrocarbon motor used in such vehicles.

It has special reference to the means for operating the adjustable fan which is ordinarily used to circulate air through the radiator for cooling purposes.

It has been customary heretofore to drive the fan from a pulley attached to the projecting end of the motor crank shaft. This has been found objectionable because of oil leaking around the packing of the projecting end of the crank shaft, which oil is picked up by the rapidly rotating fan pulley and thrown by centrifugal force in all directions. The present invention is intended to overcome this defect and secure other advantages hereinafter described. To this end I arrange the end of the crank shaft wholly within the gear case which is transversely arranged at the front end of the crank case and extend the clutch of the starting crank through a packed bearing in the front wall of the gear case to a position in proximity to a clutch on the front end of the crank shaft. As the starting crank is rotated only when it is manipulated for the purpose of starting the motor, it is an easy matter to maintain a tight joint around its shaft. Since by this arrangement there is no projecting end of the crank shaft from which to drive the fan, I use one of the auxiliary shafts for the purpose, and in the present instance I connect the fan to a pulley on the magneto shaft. In order to secure relative adjustment between the driving and driven shafts for operating the fan, I have devised a very simple adjustable fan bracket and improved means for mounting it.

Other features of my invention and their advantages will be apparent from the following description.

In the accompanying drawings, Figure 1 is a front elevation of a motor for a motor vehicle, embodying my invention; Fig. 2 is a view partly in vertical section of the fan and its adjustable bracket; and Fig. 3 is a cross section on the line 3—3 of Fig. 1.

In the drawings, 1 represents one of the cylinders of a hydrocarbon motor which is provided with the inlet and exhaust chambers 2, 3. The crank case 4 has preferably at its front end the laterally extending hollow arms 5, the ends of which are adapted to rest upon the side bars of the motor vehicle, as is well understood. These hollow arms form a gear case 6 in which are mounted a train of gears for driving the cam shafts, water pump and magneto for properly operating the motor. The crank shaft 7 extends through from the crank case into the gear case 6 and there terminates, carrying upon its end the clutch teeth 8 with which the clutch teeth of the starting shaft 10 coöperate in the usual manner. The starting shaft is provided with the usual crank arm 11 and handle 12 for manually operating it to start the motor.

The front end of the gear 6 is provided with a removable cover 13 to which is secured a sleeve 16 in which the starting shaft 10 is mounted. For a further description of this starting shaft reference may be had to the above mentioned parent application.

On the end of the crank shaft 7 is secured a driving gear 24 which meshes with the cam shaft gears 25 and 26, which latter gears drive the gears 27, 28 on the pump and magneto shafts respectively. The gears 25, 26, are bolted to flanges 32, 33, on the respective cam shafts 34, 35, in the usual manner, and the gear 27 is suitably attached to the pump shaft 36. The gear 20 is attached to the magneto shaft 37 which is mounted in spaced bearings 38 in the crank case arm and this shaft is oiled by the spray from the crank case which passes up through a channel 39 leading from the interior of the crank case to the central part of the shaft. On the rear end of the shaft 37 is mounted one of the members 40 of a universal coupling by which it is connected with the armature shaft 41 of the magneto 42. The member 40 has an annular flange 43 formed integral therewith, and to this flange is bolted the web of a pulley 44, which pulley extends forwardly from said shaft.

The pulley 44 is arranged in a vertical plane with a pulley 45 which is secured to the hub of a fan 46 so that the fan may be driven by a belt 47 passing over these pulleys.

The fan and its pulley are mounted upon a bracket on the front side of the forward motor cylinder, and this bracket is adjustably secured to a bracket carried by the cover of the water jacket of the cylinder.

As will be seen by reference to Fig. 2, the hub 67 of the fan surrounds the spindle 48 and is mounted on ball bearings thereon. This spindle 48 projects forwardly from the bracket 49, being rigid therewith and formed in any suitable way. As shown, it is screwed into a suitable boss on the bracket. The bracket 49 is formed of a central vertical portion 50 which carries the spindle 48, an upwardly extending screw-threaded portion or arm 51, and two downwardly extending separated arms 52 which are bifurcated at their lower ends forming slots parallel with the arm 51. The arms 52 are adjustably secured to the end wall of the cylinder by bolts 53 fastened through the slots. The arm 51 passes through an opening 54 formed in a forward extension 54ª of a bracket 55 carried by the water jacket cover 56, and is adjustably secured to said latter bracket by the two nuts 57 arranged on opposite sides of the extension 54ª. By adjusting these nuts the bracket may be raised or lowered and may be held firmly in adjusted position by the nuts 57ª and the bolts 53, thus permitting tension adjustment of the belt 47.

The bracket 55 carried by the water jacket cover 56 may be integral with the cover or may be secured thereto in any suitable way. This bracket has a suitably inclined ledge 58 upon which is mounted a support 59 for the high tension ignition wires of the motor, this support being preferably composed of fiber block with suitable openings 60 therein for the passage of the ignition wires 61 which are adapted to be connected with the magneto.

Having thus described my invention, what I claim is:

1. In a device of the class described, the combination with a crank case having a laterally extending arm, of a magneto shaft mounted in bearings in said arm, a member of a universal coupling on the end of said shaft, a flange on said member, and a pulley secured to said flange.

2. In a device of the class described, the combination with the crank case having a laterally extending arm, of a magneto shaft mounted in bearings on said arm, an armature shaft for the magneto in line with said shaft, a universal coupling joining the ends of said shafts, a flange on the member of the universal coupling on the magneto shaft, and a pulley having its web bolted to said flange.

In testimony whereof I affix my signature in presence of two witnesses.

RUSSELL HUFF.

Witnesses:
C. I. DALE,
W. H. FINCKEL, Jr.